July 19, 1932.　　　R. ZREBIEC　　　1,868,268
DISHWASHER
Filed Dec. 13, 1930
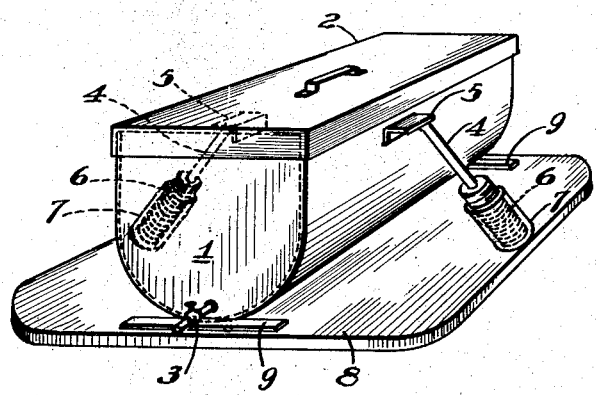
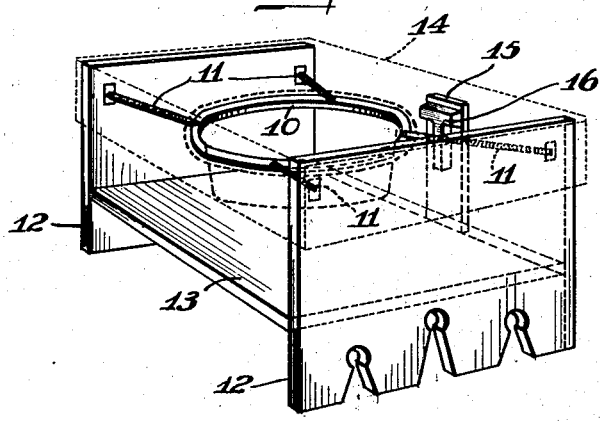
WITNESSES　　　　　　　　　　　　　　　INVENTOR Patented July 19, 1932

1,868,268

UNITED STATES PATENT OFFICE

ROSE ZREBIEC, OF BEAVER FALLS, PENNSYLVANIA

DISHWASHER

Application filed December 13, 1930. Serial No. 502,127.

My invention relates to a dish washing apparatus, particularly one which is manually set in motion and whose motion is then continued by means of springs.

The object of my invention is to provide a compact, portable, and simple apparatus for the washing of dishes without the use of one's hands. A further object is to provide such an apparatus that can be inexpensively manufactured so as to be within the reach of everyone.

In the accompanying drawing, Fig. 1 represents a perspective view of the apparatus, and Fig. 2 represents a similar view of a modification of my invention.

In Fig. 1, a metal pan 1, which has a rounded base in order to allow it to be rocked back and forth, is provided with a cover 2. A manually operable valve outlet 3 is located in one end at its lowest point. Opposite the center of each side of the pan there is a rod 4, the upper end of which is hinged to a bracket 5, which is attached to the side of the pan near its top. The opposite end of the rod is attached to the upper end of a spiral coil spring 6, the opposite end of the spring being attached to the base board 8 at a point somewhat removed from the side of the pan. A shield or guard 7 encircles the spring. The pan rests upon the base board and is prevented from sliding endways by cleats 9 attached to the base board at each end of the pan.

To operate the apparatus, soapy water and dishes are placed in the pan, and the cover is put in place. The pan is then tilted to one side thus compressing the spring on that side, and at the same time stretching the spring on the other side. When the pan is released it will rock back toward the other side, and then back and forth, due to the action of the springs. This rocking action will continue in a gradually diminishing degree and can be accelerated at intervals by merely giving the pan another push or pull. When the dishes are washed, the water can be drained through the valve outlet.

Fig. 2 represents a modification of my invention. A ring or rim 10, of a size suitable to accommodate and support a dish pan of a standard size, is suspended between two upright supports 12 by means of spiral coil springs 11, the ends of which are attached to the ring and upright supports respectively. The latter are held erect and spaced apart at a suitable distance by means of a cross piece 13. Attached to the cross piece, midway between said upright supports, is a post 15 of suitable material extending upward to a point at least on a horizontal line with the ring. On said vertical post at a point level with the ring when the apparatus is in use, is attached a rubber bumper 16. A cover 14 fits over the top of the entire device and extends downward far enough to prevent water from the pan from splashing about the room.

Soapy water, and the dishes to be washed, are placed in a dish pan mounted in the supporting ring 10, and the cover is put in place. The pan is then pulled straight back and released. The action of the springs throws the ring and pan forward toward or against the bumper 16, which causes the water to swish forcefully around the dishes. The counter action of the springs then pulls the ring and pan back again, and this backward and forward movement continues for some time. It can, of course, be accelerated at any time by merely giving the pan another push or pull.

The advantage of my invention lies in the time and drudgery it saves the person who would otherwise have to wash the dishes by hand. It is inexpensive to construct, and it can easily be carried about and put out of sight when not in use. Many uses and advantages of this invention will be apparent to those familiar with the art.

According to the provisions of the patent statutes, I have explained the principle and mode of operation of my invention and have described what I now consider to represent its best embodiment. However, I desire to have it understood that, within the scope of the appended claims, the invention may be practiced otherwise than as specifically illustrated and described.

I claim:

1. A dish washing apparatus consisting of a frame having fixed upright supports, springs attached near the top of the supports, a horizontally disposed metal ring of a size suitable to support a dish pan therein supported between the supports by means of the springs, and a resilient bumper secured to the frame in line with the ring when the apparatus is in use.

2. A dish washing apparatus comprising a frame having end walls and a connecting bottom wall, springs attached at their outer ends to the upper ends of the end walls adjacent the edges, an annulus resiliently supported by the inner ends of the springs for the reception of a dish pan, a cushion bumper secured to the frame and disposed laterally of the annulus in horizontal alignment therewith and said frame adapted to receive a cover.

In testimony whereof I sign my name.

ROSE ZREBIEC.